United States Patent Office 3,266,756
Patented August 16, 1966

3,266,756
AEROPLANES
Robert Standly Hammond, St. Annes, Alastair Robert Gilmour, Ashton, Preston, and James Paul Richardson, Lytham, England, assignors to British Aircraft Corporation (Operating) Limited, London, England, a British company
Filed Mar. 22, 1965, Ser. No. 441,505
Claims priority, application Great Britain, Mar. 24, 1964, 12,444/64
12 Claims. (Cl. 244—135)

This invention relates to aeroplanes having wings connected to the fuselage for pivotal movement in sweep about fixed axes, e.g. between an outspread position for flight at subsonic speeds and a swept-aft position for flight at supersonic speeds.

One object of the invention is to provide, in an aeroplane of this kind, means by which liquid propulsive fuel or other fluid may be transferred between the wings and the fuselage in either direction. In an aeroplane of the kind referred to, according to the invention, a wing pivot or each wing pivot comprises a tubular element co-axial with the wing pivot axis and constituting a duct through which a liquid can be transferred between the respective wing and the fuselage irrespective of the sweep angle of the wing.

The tubular element is preferably in the form of a pivot pin fixedly mounted in spaced parts of the fuselage structure and having axially spaced bearing surfaces which are received in journal bearings provided in the wing root.

A further object of the invention is to provide clamping means for securing the wing pivot pin non-rotatably to the fuselage structure. For this purpose, one end of the pivot pin preferably passes through an aperture in a part of the fuselage structure and is provided with a circumferential groove accommodating a split ring which co-operates with a segmentally divided annular wedge member closely surrounding the pin between the split ring and the said part of the fuselage structure, and a nut screw-threaded on said end of the pivot pin is arranged to urge the segments of the wedge member radially inwards and thereby to tend to force the split ring away from the said part of the fuselage structure so as to clamp the pin to the said part.

Figure 1:
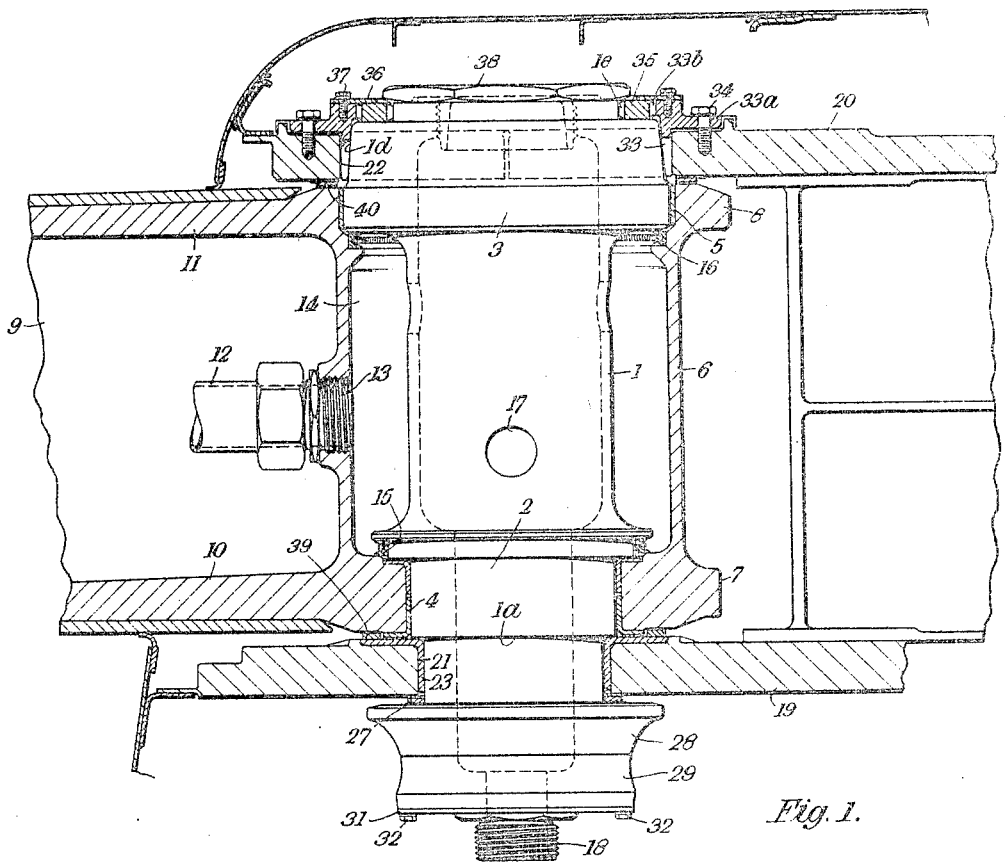
Figure 2:
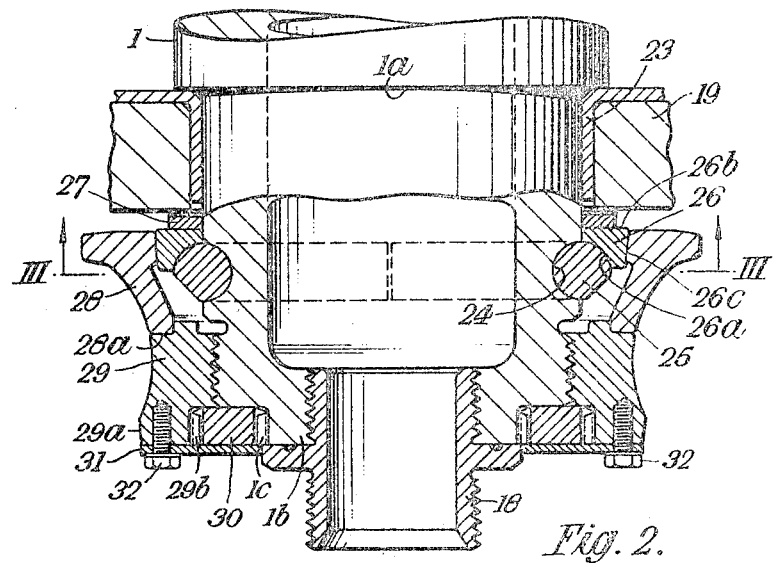

One embodiment of the invention will now be described in more detail by way of example and with reference to the accompanying drawings, in which:

FIG. 1 is a sectional elevation of a wing pivot.
FIG. 2 a section, to a larger scale, of the arrangement for clamping the pivot pin to the fuselage structure, and
FIG. 3 a cross-section on the line III—III of FIG. 2.

In this embodiment, the wing pivot comprises a hollow pivot pin 1 having axially spaced bearing surfaces 2, 3, co-operating with journal bearings 4, 5 provided in the wing root. The wing root comprises a substantially cylindrical shell 6 having end flange portions 7, 8 in which the bearings 4, 5 are disposed. The shell 6 is integral with the root end of the wing spar 9 and its bottom and top flanges 10, 11. A tube 12 leading from a fuel tank (not shown) in the wing is connected through a union 13 to the interior of the shell 6 between the bearings 4, 5. The annular chamber 14 between the shell 6 and the pivot pin 1 is sealed by rotary seals 15, 16 so that fuel cannot escape through the bearings 4, 5. The pivot pin 1 is formed with apertures 17 to permit fuel to pass from the chamber 14 into the interior of the pin 1, and with a pipe union 18 screwed into its lower end to which a fuel supply pipe (not shown) extending into the fuselage is connected.

The fuselage structure incorporates two vertically spaced lugs or brackets 19, 20 provided with aligned bores 21, 22, respectively, for receiving the pivot pin 1. When the wing is presented to the fuselage on assembly, the flange portions 7, 8 are disposed above and below the fuselage brackets 19, 20, respectively, with the bearings 4, 5 aligned with the bores 21, 22. The pin 1 is then inserted from the top. The bore 21 has a flanged bushing 23 through which it locates the pin 1 axially by co-operating with a stepped portion 1a of the latter.

Figure 3:
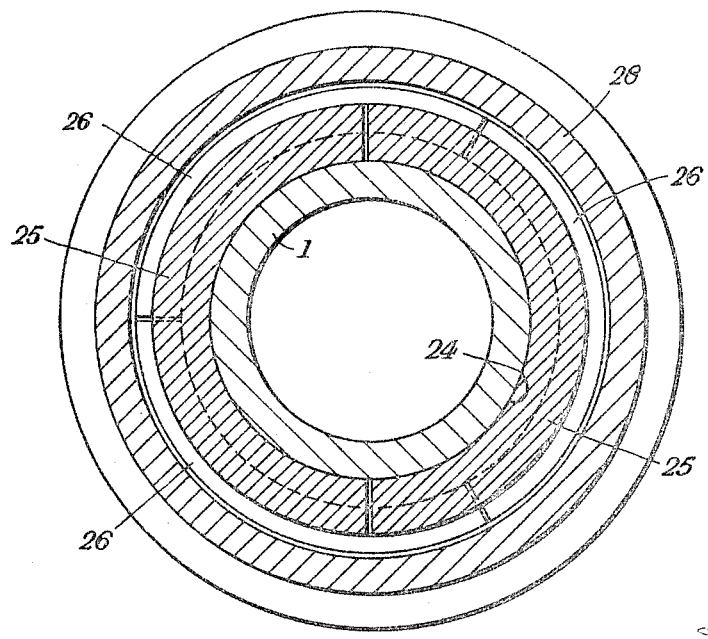

The bottom of the pin 1 is clamped to the bracket 19 by means of the arrangement shown in more detail in FIGS. 2 and 3. The pin 1 is provided with a circumferential groove 24 accommodating a ring 25 which is part-circular in section and is made in two segments (as seen in FIG. 3) so that it can be placed in the groove 24 after the lower end of the pin 1 has been inserted through the bore 21. A second ring 26 forming an annular wedge member is fitted closely around the pin 1 between the split ring 25 and the fuselage bracket 19. The wedge member 26 is divided into three segments with radial gaps between the segments (see FIG. 3) so that the segments can be urged radially inwards until they contact the cylindrical surface of the pin 1 above the groove 24, as shown in the drawings. Each segment of the wedge member 26 has a concave inner face 26a co-operating with the upper face of the split ring 25, a plane upper face 26b co-operating with a thrust washer 27 and a downwardly tapered outer face 26c. The tapered outer face 26c mates with a correspondingly tapered inner face of a third ring member 28, the bottom surface 28a of which is engaged by the upper surface of a nut 29 threaded on the lower extremity of the pin 1.

As the nut 29 is tightened, it forces the ring member 28 upwards and due to the mating tapered faces of ring member 28 and the segments of the wedge member 26 the latter are urged radially inwards once the thrust washer 27 has come up against the underside of the fuselage bracket 19. On being thus urged inwards, the segments of the wedge member 26 tend to force the split ring 25 away from the thrust washer 27 and the fuselage bracket 19, through the co-action of their curved inner surface 26a with the surface of the split ring 25. Since the pin 1 is restrained from downward movement by the shoulder 1a co-operating with the bush 23 on the fuselage bracket 19, the effect is to the clamp the pin 1 to the fuselage bracket 19. Inward movement of the segments of the wedge member 26 is limited by their coming into contact with the cylindrical surface of the pin 1 above the groove 24, so that excessive clamping pressure which might damage the bush 23 cannot be exerted thereon.

The nut 29 has a downwardly extending annular portion 29a with internal serrations 29b and the pin 1 has a reduced lower end portion 1b with similar external serrations 1c. A locking ring 30 with co-operating serrations on its inner and outer faces is used to prevent relative rotation of the nut 29 and pin 1 and is kept in place by a keep-plate 31 secured by screws 32. The numbers of serrations 29b, 1c, on the nut and pin may differ by a small number to give a vernier adjustment effect.

The top of the pivot pin 1 has a tapered side surface 1d and is located centrally in the bore 22 and held against rotation by a tapered and slotted sleeve 33 forced into the anular space between the surface 1d and the bore 22 by means of bolts 34 passing through a flange 33a on the sleeve and screwed into the fuselage bracket 20. Internal serrations 33b on the head of the sleeve 33 and external serrations 1e on the reduced head of the pin 1 co-operate with a locking ring 35 to provide a further means for preventing relative rotation. A vernier effect may again be obtained by using slightly different numbers of serrations on the pin and sleeve. The locking ring 35 is retained by a keep-plate 36 secured by bolts 37. The reduced upper end of the pin 1 is internally screw-threaded and closed by a hexagon-headed screw cap 38.

Dust seals 39, 40 are provided between the wing root flanges 7, 8 and the fuselage brackets 19, 20, to prevent access of dust to the wing pivot bearings 4, 5.

This wing pivot construction provides a convenient means of transferring fuel from wing tanks to engines mounted on the fuselage which is not affected by adjustment of the sweep angle of the wings, and an effective way of clamping the pivot pin to the fuselage structure.

What we claim as our invention and desire to secure by Letters Patent is:

1. An aeroplane having wings connected to the fuselage for pivotal movement in sweep about fixed axes, wherein a wing pivot comprises a tubular pivot pin constituting a duct through which liquid fuel can be transferred between the wing and the fuselage irrespective of the sweep angle of the wing, said pivot pin being fixedly mounted in aligned bores in vertically spaced members of the fuselage structure and axially located therein by a shouldered portion of said pin co-acting with one of said members.

2. An aeroplane according to claim 1, wherein the pivot pin is restrained from rotating relative to the said members by means of a tapered and slotted sleeve wedged between one end of the pin and one of said aligned bores.

3. An aeroplane according to claim 2, wherein the pivot pin is further restrained from rotating relative to the said members by a locking ring engaging serrations on the pin and on the sleeve.

4. An aeroplane according to claim 1, wherein the end of said pivot pin adjacent said shouldered portion passes through the bore in said one of said members, and said end of said pivot pin is formed with a circumferential groove accommodating a split ring which co-operates with a segmentally divided annular wedge member closely surrounding said pin and disposed between said split ring and said member on the side of said member opposite to said shouldered portion of said pin, a nut screw-threaded on the extremity of said pivot pin being adapted to urge the segments of said wedge member radially inwardly to clamp said pin to said member.

5. An aeroplane according to claim 4, wherein the nut acts on a ring member which has a tapered inner face co-operating with correspondingly tapered outer faces of the segments of the wedge member.

6. An aeroplane according to claim 4, wherein the split ring is at least partly circular in section and the segments of the wedge member have complementary concave inner faces co-operating with the split ring.

7. An aeroplane according to claim 4, wherein a locking ring engages serrations on the nut and on the pivot pin to prevent relative rotation thereof.

8. An aeroplane having wings connected to the fuselage for pivotal movement in sweep about fixed axes, wherein a wing pivot comprises a tubular pivot pin constituting a duct through which liquid fuel can be transferred between the wing and the fuselage irrespective of the sweep angle of the wing, said pivot pin being fixedly mounted in aligned bores in vertically spaced members of the fuselage structure, said tubular pivot pin arranged to communicate at one end with a liquid duct extending into the fuselage, whilst an intermediate part of the pin is apertured and enclosed by a chamber whose wall forms part of the wing root and which is in communication with the interior of the wing.

9. An aeroplane having wings connected to the fuselage for pivotal movement in sweep about fixed axes, wherein a wing pivot comprises a tubular pivot pin constituting a duct through which a liquid can be transferred between the wing and the fuselage irrespective of the sweep angle of the wing, said pivot pin being fixedly mounted in vertically spaced parts of the fuselage structure and having vertically spaced bearing surfaces received in journal bearings provided in the wing root, the said tubular pivot pin being arranged to communicate at one end with a liquid duct extending into the fuselage, whilst an intermediate part of the pin is apertured and enclosed by a chamber whose wall forms part of the wing root and which is in communication with the interior of the wing, the wall of the chamber having end flange portions in which are disposed bearings co-operating with the bearing surfaces of the pivot pin.

10. An aeroplane having wings connected to the fuselage for pivotal movement in sweep about fixed axes, wherein a wing pivot comprises a tubular pivot pin constituting a duct through which a liquid can be transferred between the wing and the fuselage irrespective of the sweep angle of the wing, said pivot pin being fixedly mounted in vertically spaced parts of the fuselage structure and having vertically spaced bearing surfaces received in journal bearings provided in the wing root, the said tubular pivot pin being arranged to communicate at one end with a liquid duct extending into the fuselage, whilst an intermediate part of the pin is apertured and enclosed by a chamber whose wall forms part of the wing root and which is in communication with the interior of the wing, a tube leading from a fuel tank in the wing being connected to the interior of the chamber.

11. An aeroplane according to claim 8, wherein the wall of the chamber has end flange portions in which are disposed bearings co-operating with the bearing surfaces of the pivot pin.

12. An aeroplane according to claim 8, wherein a tube leading from a fuel tank in the wing is connected to the interior of the chamber.

References Cited by the Examiner

UNITED STATES PATENTS 3,039,721    6/1962    Rogers _____ 244—135

MILTON BUCHLER, *Primary Examiner.*

B. BELKIN, *Assistant Examiner.*